(No Model.) 4 Sheets—Sheet 3.
B. A. FISKE.
RANGE FINDER.
No. 538,246. Patented Apr. 30, 1895.
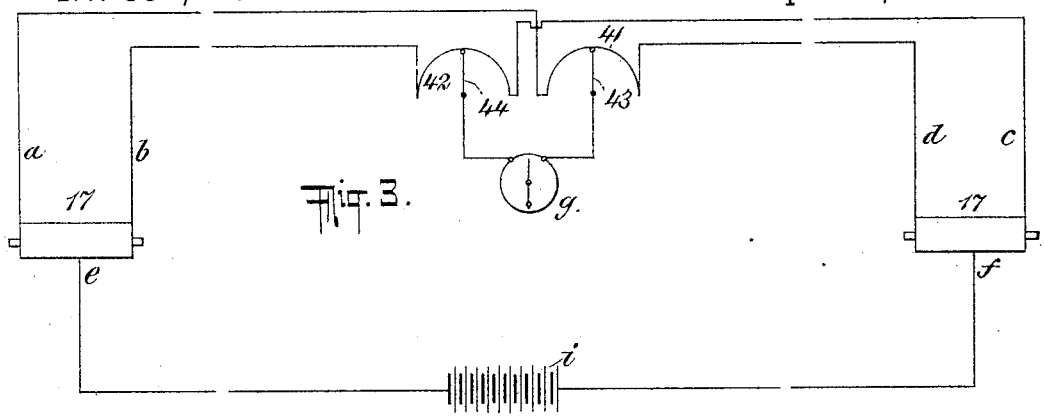
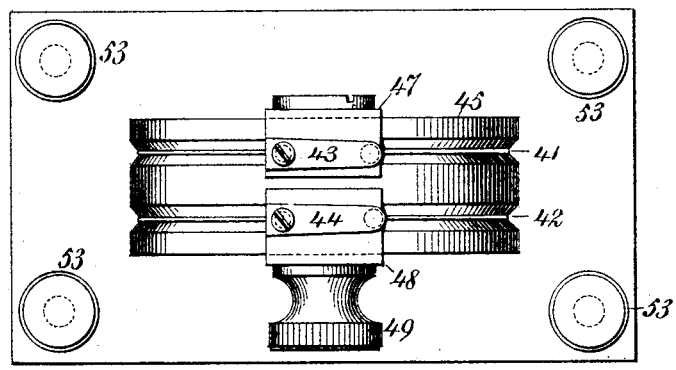
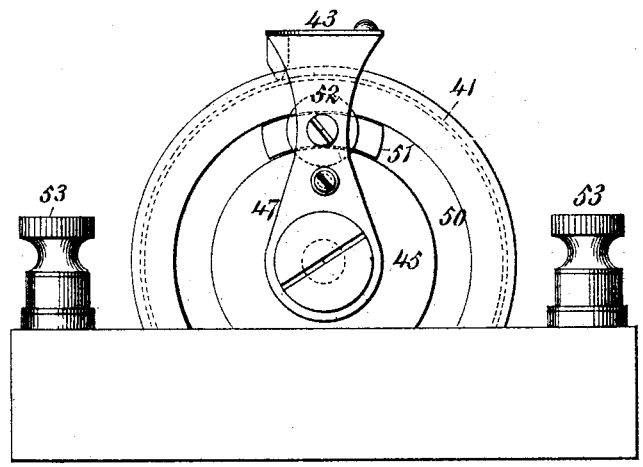
WITNESSES:
Gustave Dieterich
H. R. Moller
INVENTOR
Bradley A. Fiske
BY Park Benjamin
his ATTORNEY.

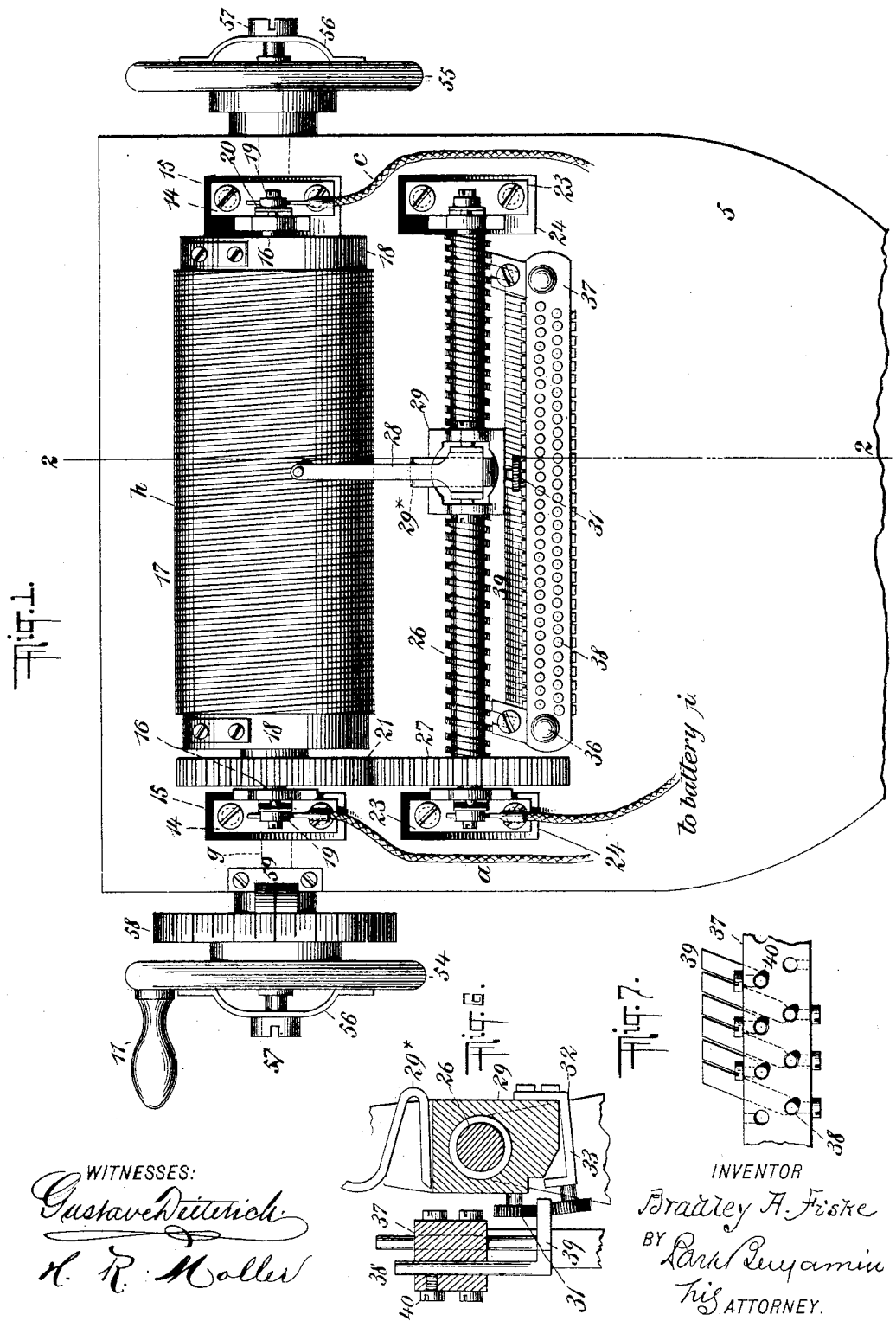

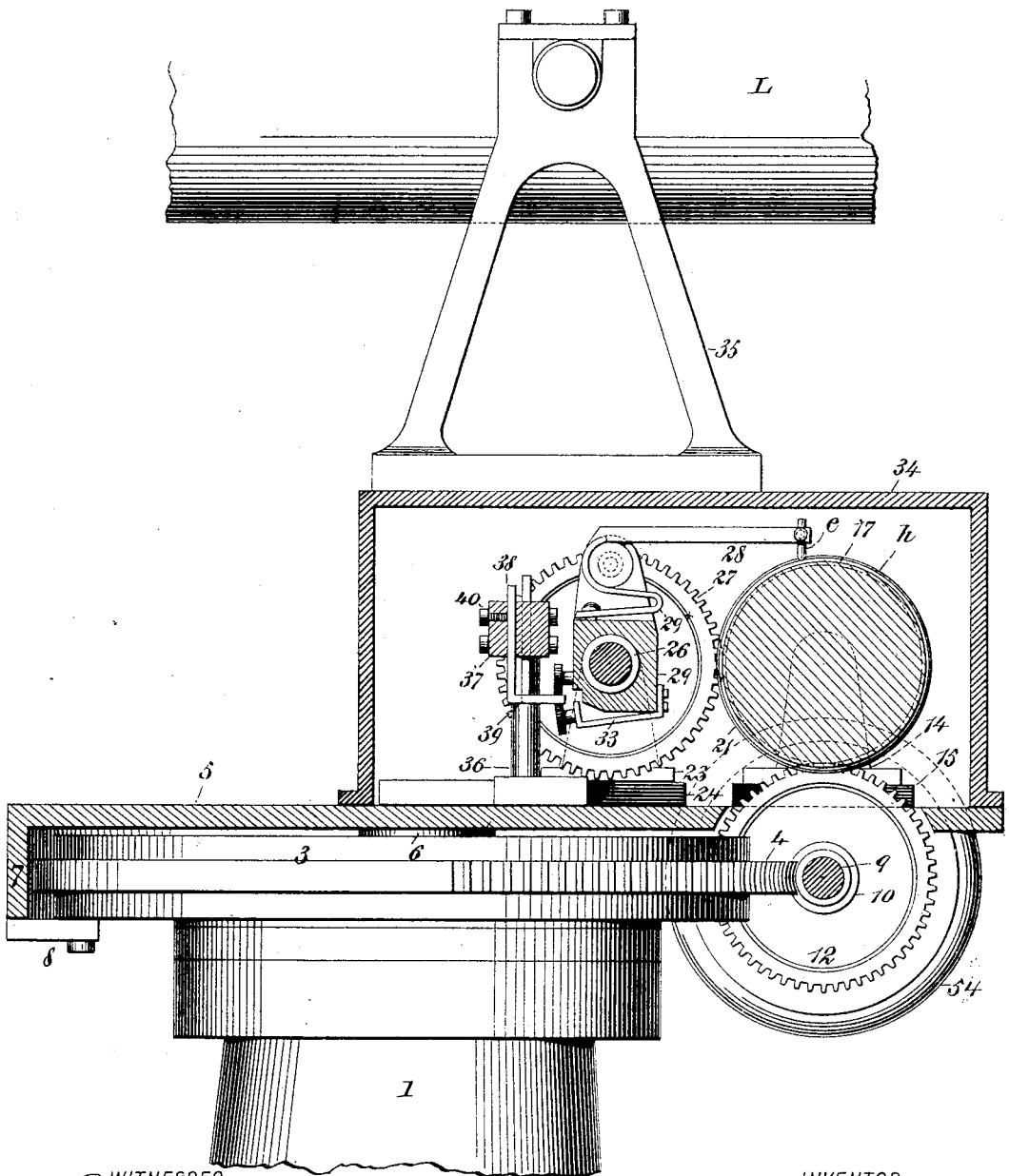

(No Model.) 4 Sheets—Sheet 4.
B. A. FISKE.
RANGE FINDER.
No. 538,246. Patented Apr. 30, 1895.
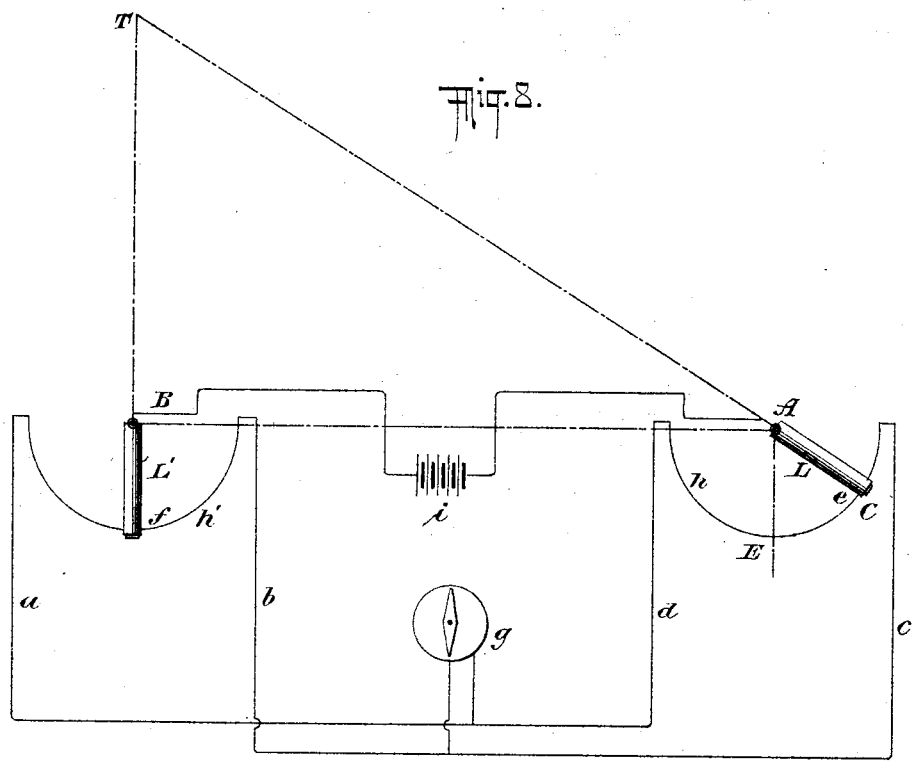
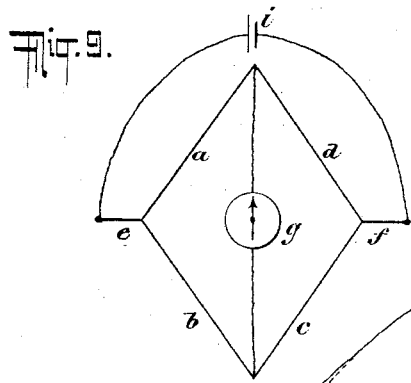
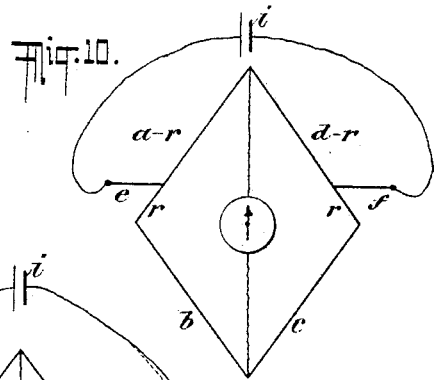
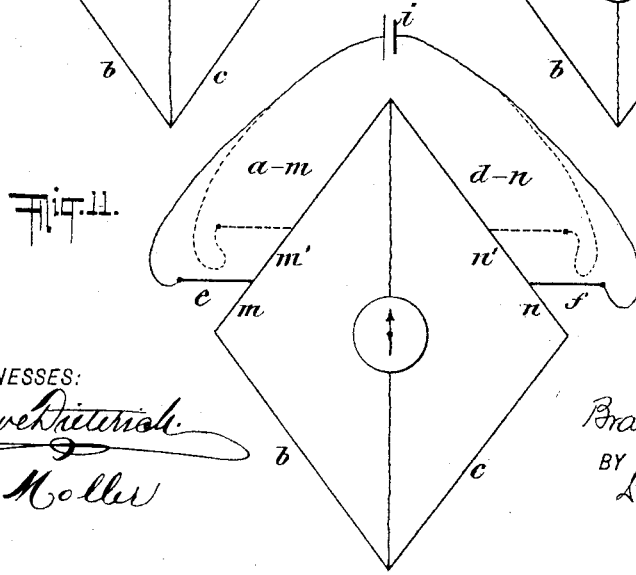
WITNESSES:
Gustave Dieterich
H. R. Moller
INVENTOR
Bradley A. Fiske
BY Park Benjamin
his ATTORNEY.

UNITED STATES PATENT OFFICE.

BRADLEY ALLAN FISKE, OF THE UNITED STATES NAVY.

RANGE-FINDER.

SPECIFICATION forming part of Letters Patent No. 538,246, dated April 30, 1895.

Application filed September 25, 1894. Serial No. 524,034. (No model.)

*To all whom it may concern:*

Be it known that I, BRADLEY ALLAN FISKE, of the United States Navy, have invented a new and useful Improvement in Range-Finders, of which the following is a specification.

In United States Letters Patent No. 406,830, dated July 9, 1889, and in various other Letters Patent subsequently granted to me, I have described and claimed an improved type of range finder.

The nature of my present invention will be best understood by first briefly considering the general arrangement of my range finder as described in said prior patents, which is illustrated in the diagram Figure 8.

In said diagram A B represent a base line between the pivots of the two telescopes L L'. T is the object upon which the telescopes L L' are trained. The telescopes L L' sweep over arcs $h$ $h'$ of conducting material, with which they make contact. A battery, $i$, is connected to the pivot points A B. The arcs $h$ $h'$ are connected in Wheatstone bridge circuit by the wires $a, b, c, d$, and the galvanometer $g$ is in loop, as usual. When the telescopes L and L' are placed parallel in the middle parts of their arcs, then the resistances in the branches $a b c d$ of the bridge are equal and the galvanometer $g$ does not deflect. When the telescopes are directed upon the object T, then the galvanometer will be deflected (electromotive force remaining constant) proportionally to the resistance of the distance E C on the arc $h$, and as this distance measures the angle E A C, which bears a relation to the distance of the object T, it follows, in accordance with the method fully explained in my prior patents aforesaid, that the galvanometer may be at once marked in units of distance, and that the range may be directly read from it.

It is of prime necessity, in this apparatus, that the galvanometer shall not be deflected when the two telescopes are relatively parallel, no matter what their positions may be on the conducting arcs $h$ $h'$. This, however, presupposes an exact equality in resistance, per unit length, of the branches $a b c d$ of the bridge; or rather of that part of them, namely, the wires $h h'$, over which the telescopes move. This condition is, however, one that is seldom encountered, for, in practice, although the telescopes may be parallel, the galvanometer almost always shows some slight deflection, the amount of which may vary in accordance with different positions of the telescopes upon their arcs. Hitherto it has been possible to avoid this error in the instrument only by careful selection of the wire forming the conducting arcs $h$ and $h'$, in order to obtain such pieces of wire as are uniform in resistance per unit length.

Still another difficulty which has been encountered in practice is the error arising from temperature affecting the conductors on one side of the bridge differently from those of the other side. Here, even if the telescopes stand parallel, and even if the conducting arcs $h$ $h'$ be physically the same, still there will be a deflection of the needle.

The principal object of my present invention is to provide means for eliminating both of the foregoing sources of error; and to this end it consists in apparatus whereby, first, the position of the contact points upon the conducting arcs $h$ $h'$ may be automatically changed so as to compensate for any error due to the resistance of the bridge branches not being uniform per unit length, and, second, in a device for modifying the lengths of the bridge arms to compensate for temperature error as hereinbefore set forth.

My invention further consists in the novel construction and arrangement of the essential portions of the instrument whereby it is rendered much more compact in form than hitherto, whereby the operation is rendered more certain, whereby the conducting wires over which pass the sliding contacts are protected from the weather and dust, and whereby error due to expansion or contraction of the supports of said wire is eliminated.

In the accompanying drawings, Fig. 1 is a plan view of the instrument. Fig. 2 is a vertical section on the line 2 2 of Fig. 1. Fig. 3 represents, diagrammatically, the general arrangement of the instrument embodying the construction hereinafter more particularly explained. Fig. 4 is a plan view of the temperature-correcting device. Fig. 5 is a side elevation of the same. Fig. 6 is an enlarged, detail, cross-sectional view of the contact arm controlling mechanism. Fig. 7 is a plan view of the adjusting pins and their supporting bar. Fig. 8 represents, diagrammatically, the typical arrangement of my range finder. Figs. 9, 10, and 11 are Wheatstone bridge diagrams illustrating the changes in position of the contact points e f.

Similar letters and figures of reference indicate like parts.

The term "instrument" in the following description means one of the two instruments which together are united in Wheatstone bridge with the galvanometer and battery; all of these appliances combined forming the complete range finder.

The instrument is mounted upon a suitable standard, 1, which is of such size as to bring the telescope L at a proper height for the eye of an observer. On the pedestal 1 is rigidly secured a circular table, 3, and around the edge of this table is a worm-wheel, 4.

The mechanism of the instrument is supported upon a metal plate, 5, which in turn is supported on a pivot, 6, seated in pedestal 1. The rear side of the plate 5 is semicircular in form and is provided with a downwardly-turned flange, 7. Secured on the under side of table 3 is a pointer, 8. On the flange 7 may be marked a scale of any suitable divisions and with reference to the pointer 8, the plate 5 may be adjusted in any definite position. Journaled on the under side of the plate 5 is a shaft, 9, which carries a worm, 10, engaging with the worm-wheel 4. The shaft 9 has a crank-handle, 11, so that, by turning said handle 11 and because the worm-wheel 4 is fixed, the worm 10 is caused to move around wheel 4, and in this way the supporting plate 5 is caused to rotate over any desired angle upon its pivot 6. Upon the plate 5 are bearings, 14, which rest upon insulating blocks, 15. These bearings support metal pins, 16, upon which pins the box-wood cylinder 17 rotates. Each pin, 16, is secured to a metal cap, 18. The caps are internally threaded and receive the ends of cylinder 17. In the cylinder periphery is a spiral, in which is wound the conducting wire $h$, having its ends connected to caps 18. On the brackets 14 are binding-posts, 19, which communicate by leaf-springs, 20, with the pins 16. When the wires $a$ and $c$ are connected to these posts there is circuit from one binding-post 19 to its leaf-spring 20, to pin 16, to one cap 18 through the conducting wire $h$ to the other cap 18, leaf-spring 20, binding-post 19 and wire $a$.

Upon one end of cylinder 17 and insulated therefrom is a gear-wheel, 21, which engages with the gear-wheel 12 on and insulated from the shaft 9. Therefore, when the handle 11 is turned the mechanism so far described produces both a rotation of the supporting plate 5 on its pivot 6 and also a rotation of the cylinder 17. Also on plate 5 are two other brackets, 23, supported upon insulating blocks, 24. In these brackets is journaled a shaft, 26, the periphery of which is screw-threaded and which also carries a pinion, 27, insulated from said shaft, which engages with the gear-wheel 21. Electrical communication is made through one of the brackets 23 to the shaft 26, one of the wires leading from the battery $i$ being connected to the bracket.

Upon the shaft 26 is a nut, 29, having an arm, 28, which terminates in a contact-point, $e$, of platinum. This point enters the spiral groove on the cylinder 17 and bears upon the wire therein. Connected to the arm 28 and below its pivot point is a leaf-spring, 29*, (the nut being recessed to receive said spring,) the effect of which is to force the contact point $e$ down into constant touch with the wire $h$. On the rear side of the nut 29 is a small roller, 31, and carried on the under side of said nut by a spring-arm, 32, is another roller, 33.

Before describing the use of the two rollers 31, 33, I will point out the third result which is caused by the rotation of the handle 11—namely, the rotation through the gears 21 and 27 of the screw-shaft 26 and the consequent movement of the contact point $e$ along the spiral in the cylinder 17, the pitch of the screw on shaft 26 and the pitch of the thread on cylinder 17 being the same.

The mechanism so far described and that which will be described hereinafter is all inclosed in a box, 34, upon the top of which the telescope L is mounted in suitable standards, 35.

Let it now be supposed that the two instruments are placed at opposite ends of a base line passing through the axes of the two cylinders 17; also that the contact points $e\ f$ in the two instruments are at the middle points of the wires $h\ h'$ wound upon the cylinders 17. The two telescopes L and L' will then be parallel in a position at right angles to the base line, and therefore directed at some point in space infinitely distant. The galvanometer will then show no deflection, the needle indicating the infinity mark. Following the conditions represented in Fig. 8, let one instrument remain in this condition, with the telescope pointing toward the object T, while the other telescope is trained upon the object. To this end the handle is turned, thus rotating simultaneously the supporting plate 5 and thus training the telescope upon the object, while at the same time through the gearing already explained the cylinder 17 and the screw-shaft 26 are both rotated, causing the contact point $e$ to move over the wire $h$ in the cylinder 17 a distance which is obviously proportional to the amount of angular train of the telescope. Therefore, when the telescope shall have been trained upon the object T, the contact point $e$ in that instrument will have moved over a distance on the wire $h$ represented by the distance E C in Fig. 8.

I now come to the means for compensating for non-uniformity in the resistance of conducting wires $h\ h'$ per unit length; but before considering the details of the mechanism, I will explain more fully its principle. If, in the simple form of Wheatstone bridge shown in Fig. 9, the four branches are exactly equal one to the other ($a=b=c=d$), then if the two contact points $e$ and $f$ be placed exactly at the angle between $a$ and $b$ and $c$ and $d$, the bridge will balance; because $ac=bd$. If the contact points $ef$ be moved along the branches $a\ d$ for equal distances, and if the branches are assumed to be of uniform resistance, said points will then have moved over equal resistances, represented by $r$, Fig. 10. The bridge will still be in balance, for $(a-r)(c+r)=(b+r)(d-r)$; because (since $a=b=c=d$) this may be written $(a-r)(a+r)=(a+r)(a-r)$.

It is obviously easy to place the contact points $e$ and $f$, as shown in Fig. 9, upon the wire $h$ on cylinder 17 so that the resistance in $a$ shall equal the resistance in $b$ and so that the resistance in $c$ shall equal the resistance in $d$. That is a mere matter of adjusting these points until that condition is produced; but we cannot assume that because $a=b$ and $c=d$ that $a=b=c=d$, or that $a+b=c+d$. In Fig. 10 it has been supposed that for equal distances moved over by the contact points $e$ and $f$ the resistances are likewise equal—that is, both equal to $r$. If, however, this equality of resistance does not prevail, we shall have a different condition, which is illustrated in Fig. 11, in which, although the contact points $e$ and $f$ have been moved over the same distances over the wires $a$ and $d$, the resistances given corresponding to these distances are $m$ in one case and $n$ in the other.

In order that the bridge may balance we must have $$(a-m)(c+n)=(b+m)(d-n);$$

or $$ac+an-mc-mn=bd-bn+md-mn$$

which by cancellation gives $$(a+b)n=(c+d)m$$

or $$\frac{a+b}{c+d}=\frac{m}{n}$$

which means simply that the sum of $a$ and $b$ and of $c$ and $d$ must be proportional to the resistances corresponding to the distances over which the contacts $e$ and $f$ are moved; or, in other words, to $m$ and $n$ in order that the bridge may balance. Hence, if after said contacts are moved, the bridge does not balance, it is because a correct ratio of $m$ and $n$ has not been obtained, and therefore the distance represented by either $m$ or $n$ must be increased or diminished by causing an adjustment of the contact points $ef$ until the galvanometer no longer deflects. In practice, however, as already explained, the mechanism which trains the telescopes upon the object and that which moves the arm 28 carrying point $e$ over the wire $h$ is actuated simultaneously by the crank 11. Consequently, if after, by this means, the telescopes were laid parallel in the two instruments and the points $ef$ correspondingly placed on the wires $h\ h'$, there should still be found a deflection of the galvanometer $g$, the points $ef$ could not be adjusted to new positions (thus varying $m$ or $n$) by handle 11 without moving the telescopes out of parallelism. Therefore points $ef$ must be moved independently of the telescopes in order to give the proper relation of $m$ and $n$.

Obviously in Fig. 11 the contact points $e$ and $f$ may be moved for distances not only which have corresponding resistances $m\ n$, but for any other distances, say such as have corresponding resistances $m'\ n'$. Hence there must be a proper ratio between $\frac{m'}{n'}$ as well as between $\frac{m}{n}$, and so on, in order that the galvanometer will show no deflection when the telescopes are in different positions, though corresponding.

Upon standards, 36, on the plate 5 is a transverse bar, 37. In this bar is disposed a number of pins, 38, having their lower ends, 39, turned at right angles. The pins may be separately adjusted vertically in the bar 37 and each pin is secured in place as adjusted by means of its own set-screw, as 40. The pins are also placed as closely together as possible (Fig. 7), being staggered in position; so that their lower ends, 39, form a substantially continuous guide-way, on the upper side of which rests the roller 31 on nut 29 and against the lower side of which bears the roller 33, also on said nut. When the surfaces of the ends 39 of the pins 38 lie all in the same horizontal plane, then the rollers will travel along said surfaces as the nut 29 moves along the screw-shaft 26 without causing any vibratory or tilting movement of the nut 29 on its shaft; but if said ends are not in the same plane but, in fact, form a cam surface (by reason of different vertical adjustments of the pins 38 in the bar 37) then the rollers 31 and 33, in following the irregular surface, will cause more or less of a tilting of the nut 29, and the result of such a tilting is the moving of the end $e$ of the arm 28 forward or backward upon the wire $h$ in the cylinder 17.

Now, if I provide one pin, 38, for every successive degree of angular movement given to the telescope L by the handle 11, then clearly the position of the contact point $e$ on the wire $h$ will be governed by the vertical adjustment of that pin in the bar 37; and hence, as the telescope moves over its entire azimuth and as the point $e$ simultaneously moves over the wire $h$, the position of the point $e$ on said wire $h$ will be slightly advanced or retarded for every degree of angular movement of the telescope. This will be better understood by considering the practical mode of adjusting the apparatus. Let both telescopes be adjusted parallel with the points $ef$ at the middle parts of the cylinders 17, as shown in Fig. 3, so that the galvanometer $g$ gives no deflection. The handles 11 in both instruments are now turned to change the angular position of the telescopes one degree, and by reason of the gearing provided to rotate the cylinder 17 one revolution. The contact point $e$ will then be moved over a certain distance on wire $h$ in one instrument, which distance may have the corresponding resistance $m$. The contact point $f$ will also be moved over a certain distance on wire $h'$ in the other instrument which may have the corresponding resistance $n$. If the ratio $\frac{m}{n}$ is correct, the bridge will balance and the galvanometer $g$ show no deflection; but assume the galvanometer does deflect, it is therefore necessary to vary $m$ or $n$. The rollers 31 and 33 are now respectively above and below the first pin of the series 38. This pin in either instrument is therefore to be raised or lowered in its bar, so as to cause the point $e$ to move forward or backward on the wire $h$ until the galvanometer shows no deflection. This pin is then secured as adjusted by its set-screw. The proper relation of $m$ and $n$ for that position of the telescopes has now been found and the apparatus permanently adjusted thereto. The telescopes are then changed in angular position another degree, and the cylinders rotated another revolution. The rollers 31 and 33 are now above and below the second pin of the series, 38. The contact points $e$ and $f$ have moved over distances having corresponding resistances $m'$ and $n'$. The galvanometer deflects. It is necessary to vary $m'$ or $n'$. The second pin is raised or lowered to adjust the point $e$ until the galvanometer shows no deflection, and this pin then is secured by its set-screw. The proper relation of $m'$ and $n'$ for the second position of the telescopes has been found and the instrument permanently adjusted thereto. So on for other positions of the telescopes differing successively by one degree, until finally all of the pins 38 have been adjusted and their lower ends 39 produce a more or less irregular surface—the irregularity of which reflects, so to speak, the variations in the resistance per unit length of the wires $h$ $h'$, which of course are the only parts of the bridge branches traversed by the contact points $e f$. As long as these wires remain in the instruments it is not necessary to re-adjust the pins 38, for ever afterward (barring accidents) the contact points $e$ and $f$ controlled by the pins in the manner described will automatically be adjusted to preserve the proper ratio $\frac{m}{n}, \frac{m'}{n'}$, &c., for every position of the telescopes varying by one degree. It is therefore no longer necessary to expend time in making wires $h$ $h'$ of uniform resistance per unit length, or in selecting such wires. All that is needed is that they shall, in the beginning, approximate the proper condition in this respect, and any error is met by the correcting mechanism just described.

So far, in considering the general expression $\frac{a+b}{c+d}=\frac{m}{n}$, I have referred only to the effect of non-uniformity in resistance per unit of length as causes disturbing the bridge balance; and I have now explained means for compensating or correcting for this source of error; but it will be plain that still any cause acting upon either the numerator or the denominator of the fraction $\frac{a+b}{c+d}$ will throw the bridge out of balance. Such a cause may result from temperature influences affecting the resistance of the branches $a+b$ differently from that of the branches $c+d$: such as one instrument getting hotter than the other. So, for example, the resistance of $a+b$ may increase, or that of $c+d$ diminish—or vice versa. We have simply now to compensate for the above source of error by suitably modifying the lengths of the bridge branches. Thus, if the resistance of $a+b$ becomes too small, we must increase the length of $a+b$ while diminishing that of $c+d$. For this purpose I provide the corrector which is represented in the diagram Fig. 3, and also in detail in Figs. 4 and 5. As shown in Fig. 3, 41 and 42 are arcs of wire. The arc 41 is interposed between the bridge branches $a$ and $d$; the arc 42 between the branches $b$ and $c$. Over each arc sweep contact fingers, 43 and 44. With the fingers 43 and 44 is connected the galvanometer $g$. If the fingers 43 and 44 be both considered as moved to the right of the drawings Fig. 3, then obviously the length of the branches $a$ and $b$ will be increased, while that of the branches $c$ and $d$ will be diminished. If said fingers be moved to the left $c$ and $d$ are increased and $a$ and $b$ diminished. If now, having adjusted the apparatus in the manner before described for the ratio $\frac{m}{n}$, we find that at some subsequent time or under different local conditions the galvanometer nevertheless shows a deflection, we know that it is because the relation between $a+b$ and $c+d$ has changed and therefore we simply move the contact fingers 43 and 44 equally in the proper direction to cause the galvanometer deflection to disappear.

In practice, and as shown in Figs. 4 and 5, the wires 41 and 42 are mounted upon the periphery of a disk, 45, of insulating material, supported on a suitable standard 46. Through the disk 45 passes a shaft to which is rigidly secured at one end an arm, 47, carrying the contact finger 43. Loose upon said shaft on the other side of the disk is an arm, 48, carrying the contact finger 44; said finger being held on said arm and being capable of being tightly secured thereto by the milled head 49. In the side of the disk 45 is a groove, 50, of dove-tailed shape in cross-section, in which groove is a similarly-formed sliding piece, 51, provided with a clamping screw, 52, which passes through the arm 47. The fingers are adjusted in place on the wires 41 and 42 either together or separately by hand, and after adjustment both are clamped in place by the screw 52. The bridge branches *a b c d* connect in the manner already described to binding-posts 53, which posts are electrically connected to the ends of the wires 41 and 42.

The fingers 43 and 44, as shown in Fig. 3, are connected with the galvanometer *g* in any suitable way.

Loose upon the shaft 9 are two disks, 54 and 55, to either of which the handle 11 may be applied. These disks are held with sufficient rigidity to allow of the shaft being turned by the handle by means of springs, 56, which are held against their faces by screws, 57. The object of this construction is to prevent injury to the apparatus in case the operator should cause the parts to come to the limit of their movement suddenly, in which case the force applied to the handle 11 would cause the disk to rotate on the shaft. Also upon the shaft 9 is a disk, 58, graduated in minutes, in proximity to which is a stationary datum mark, 59, on plate 5. The scale already referred to on the flange 7 of plate 5 indicates the amount of rotation of the plate on its pivot 6 in degrees, and the disk 58 enables this rotation to be further measured in minutes of arc.

While I have described the specific mechanism herein referred to as existing in a range finding instrument and therefore as constituting a part of the entire apparatus which enters into the construction of the range finder, it is to be distinctly understood that I do not limit myself to any such specific application of the said instrumentalities and combinations thereof. It will be obvious to any electrical workman or other person skilled in the art that the range-finding instrument here described is in fact a device for varying resistance in an electrical circuit, and that it embodies combinations of mechanism which may be used for that broad and general purpose, entirely irrespective of their employment in range finders; nor do I limit myself to the use of such instrumentalities merely for varying resistance in a general way—as, for example, in making electrical measurements; but I wish it understood that I claim them for every purpose to which they may be applied. Thus it will be noticed that I provide here means, not only for causing variations in resistance, but for producing such variations continuously over a certain period of time, if desired. So also I provide means for diversifying these variations, making them different at one time and another. So also I arrange the circuit so that it is sensitive to very slight variations through the disturbance of the electrical balance. So also by the production of these slight variations I provide means whereby a compensatory or corrective effect may be applied at certain periods which may be selected during the operation of a device. Apparatus having capabilities such as this is susceptible to the widest possible application, notably in telegraphy, telephony and in electrical regulating apparatus.

I claim—

1. The combination, in a device for varying the resistance in an electrical circuit, of a rotary cylinder, a conductor spirally wound thereon, a traveling contact finger bearing upon said conductor, means for positively moving said finger in the direction of the axis of said cylinder, and means for moving said finger in a direction transverse to said axis; the said circuit including said finger and a terminal of said spiral conductor.

2. The combination, in a device for varying the resistance in an electrical circuit, of a cylinder, a conductor spirally wound thereon, a traveling contact finger bearing upon said conductor, means for rotating said cylinder, means for positively moving said finger in the direction of the axis of said cylinder, means for moving said finger in a direction transverse to said axis and intermediate mechanism for causing simultaneous movement of said cylinder and finger; the said circuit including said finger and one terminal of said conductor.

3. The combination, in a device for varying the resistance in an electrical circuit, of a rotary cylinder, a conductor spirally wound thereon, a traveling contact finger bearing upon said conductor, a guide or cam surface along which said finger travels and means for moving said finger along said guide; the said parts being constructed and arranged so that, as said cylinder is rotated and said finger moved, to follow said spiral conductor, said guide surface shall cause said finger to vary its point of contact with said conductor, and said circuit including said finger and a terminal of said conductor.

4. The combination, in a device for varying the resistance in an electrical circuit, of a rotary cylinder, a conductor spirally wound thereon, a traveling contact finger bearing upon said conductor, a guide or cam surface along which said finger travels means for varying the conformation of said guide surface and means for moving said finger along said guide; the said parts being constructed and arranged so that, as said cylinder is rotated and said finger moved to follow said spiral conductor, said guide surface shall cause said finger to vary its point of contact with said conductor, and said circuit including said finger and a terminal of said conductor.

5. The combination, in a device for varying the resistance in an electrical circuit, of a cylinder, a conductor spirally wound thereon, a rotary screw-shaft supported parallel to said cylinder, a nut on said shaft, a contact finger carried by said nut and bearing upon said spiral conductor, a guide or cam surface extending longitudinally and in proximity to said shaft and a guide roller on said nut bearing on said surface; the aforesaid parts being constructed and arranged so that, as said cylinder is rotated and said nut is moved longitudinally, said shaft to carry said finger along said spiral conductor, the movement of said roller over said guide surface shall impart to said nut a vibratory or tilting motion on its shaft, thereby causing said finger to vary its point of contact with said conductor; the said circuit including said finger and a terminal of said conductor.

6. The combination, in a device for varying the resistance in an electrical circuit, of the rotary cylinder 17, the spiral conductor $h$ thereon, the screw-shaft 26, nut 29 on said shaft 26, finger 28 carried by said nut and having its contact point bearing on said conductor, roller on said nut 29, a guide or cam surface (such as formed by pins 38) traversed by said roller and gearing between said cylinder and screw-shaft; the said circuit including said finger and a terminal of said conductor.

7. The combination, in a device for varying the resistance in an electrical circuit, of the rotary cylinder 17, the spiral conductor $h$ thereon, the screw-shaft 26, nut 29 on said shaft, finger 28 carried by said nut and having its contact point bearing on said conductor, roller 31 on said nut, bar 37, adjustable pins 38 in said bar having their lower ends disposed to form a guide or cam surface traversed by said roller, and gearing between said cylinder and screw-shaft; the said circuit including said finger and a terminal of said conductor.

8. The combination, in a device for varying the resistance in an electrical circuit, of the rotary cylinder 17, the spiral conductor $h$ thereon, the screw-shaft 26, nut 29 on said shaft, finger 28 and spring 29* carried by said nut, said finger being held by said spring against said conductor, rollers 31 and 33 on said nut, bar 37, adjustable pins 38 in said bar having their lower ends disposed to form a guide interposed between said rollers, and gearing between said cylinder and screw-shaft; the said circuit including said finger and a terminal of said conductor.

9. The combination, in a range-finding instrument, of a support rotary in a horizontal plane, and mounted thereon, a telescope or sight-bar, a cylinder, a conductor spirally wound on said cylinder, a contact finger bearing on said conductor, mechanism for moving said finger along said conductor (the ends of said conductor being in branch electrical circuit with said finger) and intermediate gearing between said support and said cylinder and said cylinder and said finger; the aforesaid parts being constructed and arranged so that, when said support is rotated horizontally to direct said telescope, the said cylinder and the said finger, through said gearing, shall be simultaneously actuated to cause said finger to move to a new position on said spiral conductor and over a distance bearing a relation to the extent of angular movement of said telescope.

10. The combination, in a range-finding instrument, of the pedestal 1, fixed worm-wheel 4, pivoted supporting plate 5, shaft 9 on said supporting plate, worm gear on said shaft engaging with said worm-wheel 4, and, mounted on said plate 5, a telescope or sight-bar, a rotary cylinder, a conductor spirally wound thereon, a finger movable along said conductor (said conductor being in electrical circuit with said finger), mechanism for moving said finger and intermediate gearing between said shaft 9, said cylinder and said finger; whereby, when said shaft 9 is rotated, there is simultaneously caused the rotation of said supporting plate 5, of the cylinder and the movement of said finger along said spiral conductor on said cylinder.

11. The combination, in a range finder, of two supporting plates rotary in a horizontal plane, a rotary cylinder on each plate, the said cylinders being located at the ends of a base line, a conductor spirally wound on each cylinder, and, also supported on each plate, a telescope or sight-bar, a contact finger, mechanism for moving said finger longitudinally and said cylinder in contact with said conductor, and intermediate transmitting mechanism between said support, said cylinder and said finger, the said conductors and fingers being connected, as set forth, with an indicating instrument in Wheatstone bridge electrical circuit; whereby, when said telescopes are directed upon a distant object, the said fingers shall, through said transmitting mechanism, be moved over definite distances on said conductors, thereby disturbing the electrical balance of the circuit and causing a deflection of the indicating instrument bearing a relation to the extent of horizontal motion of the telescopes and to the range of the distant object.

12. In a range finder of the type herein specified, containing two bodies of conducting material, contact fingers moving over said bodies, sight-bars or telescopes, mechanism for imparting to said fingers movement over said bodies bearing a relation to the angular displacement of the respective associated telescopes and a Wheatstone bridge circuit as described having branches, as $a\ b\ c\ d$, including said bodies, contact fingers and also an indicating instrument, in loop circuit with said branches provided with terminals adjustable with reference to said branches; whereby, by adjusting said terminals, the relative lengths and hence resistances of said branches may be altered.

13. In a range finder of the type herein specified, containing two bodies of conducting material, contact fingers moving over said bodies, sight-bars or telescopes, mechanism for imparting to said fingers movement over said bodies bearing a relation to the angular displacement of the respective associated telescopes, and a Wheatstone bridge circuit as described including said bodies, contact fingers and an indicating instrument, means, substantially as set forth, for varying the place of contact on said fingers on said conductors, corresponding to definite positions of the telescopes and thereby compensating for variations in resistance per unit length in said conductors.

BRADLEY ALLAN FISKE.

Witnesses:
H. R. MOLLER,
M. BOSCH.